United States Patent

Parsen

[15] 3,672,636

[45] June 27, 1972

[54] CABLE GRIPPING TOWING DEVICE

[72] Inventor: Edward M. Parsen, Box 23, Miller, S. Dak. 57362

[22] Filed: Nov. 20, 1970

[21] Appl. No.: 91,256

Related U.S. Application Data

[63] Continuation-in-part of Ser. No. 861,615, Sept. 29, 1969.

[52] U.S. Cl. ..................................................254/134.3 R
[51] Int. Cl. ..........................................................E21c 29/16
[58] Field of Search...........................254/134.3 R, 134.3 CL; 24/134 CP, 249 PP, 254, 134

[56] References Cited

UNITED STATES PATENTS

| 728,768 | 5/1903 | Salisbury | 254/134.3 R |
| 3,110,480 | 11/1963 | Eitel | 254/134.3 R |
| 3,276,744 | 10/1966 | Cronkright | 254/134.3 R |

Primary Examiner—Othell M. Simpson
Attorney—Clarence A. O'Brien and Harvey B. Jacobson

[57] ABSTRACT

A cable tow device, adapted to ride on a messenger cable, is pulled along by a groundman's towrope or by a rope drawn by a vehicle. The device is provided with pivotally mounted means for securing a number of signal cables thereto. Releasable one-way locking means, in the form of mating cams, are mounted to the device and automatically clamp the device in place on the messenger cable whenever the towrope is slackened to prevent reverse movement. The pivotally mounted securing means yield when the towrope is released so as to prevent the device from being lifted off the messenger cable at the forward end.

14 Claims, 4 Drawing Figures

PATENTED JUN 27 1972 3,672,636

Edward M. Parsen
INVENTOR

BY Clarence A. O'Brien
and Harvey B. Jacobson
Attorneys

CABLE GRIPPING TOWING DEVICE

CROSS REFERENCE TO RELATED APPLICATION

The present application is a continuation-in-part of my previous application, Ser. No. 861,615 filed Sept. 29, 1969.

FIELD OF THE INVENTION

The present invention relates to cable stringing equipment and more particularly to a cable towing device.

As discussed in my previously mentioned application, a problem encountered with conventional cable towing equipment is the backward displacement of the towing device when the towrope connected thereto is slackened. The rearward displacement results from the weight of the signal cables. As a result of backward travel, sagging portions are formed at points over stringing blocks often forming kinks. Once the towing device resumes forward travel, the kinks are stretched to form a permanent deformation in the signal cable. This deformation can cause physical damage to the cable which may require subsequent maintenance or replacement. Further, with prior art devices, it has been inconvenient to remove a cable towing device from the messenger cable or strand while maintaining the towrope under tension as the towing device is moved past poles.

The cable tow device disclosed in my previous application eliminated these problems by incorporating a one-way locking means in the device which prevented backward movement. In my previously disclosed device, communication cables are attached to swivels that are solidly mounted to the trailing end of the cable grip device. When tension is relaxed on the tow line which is attached to the leading end of the grip, it has been found that upon occasion the solidly mounted swivels have a tendency to act as a lever and pivot the front end of the grip upwardly using a trailing end roller as a fulcrum. At times, the pivotal displacement is sufficient to cause disengagement between the messenger cable and the grip so as to cause the latter to slide backwards.

SUMMARY OF THE INVENTION

The present invention is directed to an improvement over my previous device. Instead of solidly mounted swivels, the present invention utilizes clevis members that are pivotally mounted to the framework of the towing device. The clevis members in turn connect swivels to which the signal cables are mounted. In the event a towrope is released, the weight of the signal cables causes the swivel-clevis assembly to pivot downwardly thereby preventing this assembly from becoming a lever arm. As a result, the towing device remains in intimate engagement with the messenger cable so as to prevent the device from jumping off the messenger cable or moving backward on the messenger strand.

An additional feature of the invention resides in the utilization of two camming members that clamp the messenger cable therebetween. One of the camming members is eccentrically mounted and gravitationally assumes a messenger cable contacting position. The second camming member is biased to clamp the messenger cable against the first camming member when the towrope is released. By using two movable camming members instead of a single movable clamping member as was disclosed in the previous application, the present one-way locking means (dual camming members) compensate for wear in the roller members that ride along the messenger cable.

A third distinct improvement of the present invention is the inclusion of a biased latch which insures that the towing device will remain on the messenger cable, even if the rollers jump off the cable. As a result, workers are not endangered by an inadvertently loosened device that will fall to the ground and perhaps cause injury or inconvenience. By insuring that the towing device will remain on the messenger cable, even if it jumps from the cable, the device can still be towed forwardly until a convenient point is reached at which time workmen may replace the towing device on the cable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

DESCRIPTION OF THE INVENTION

Figure 1:
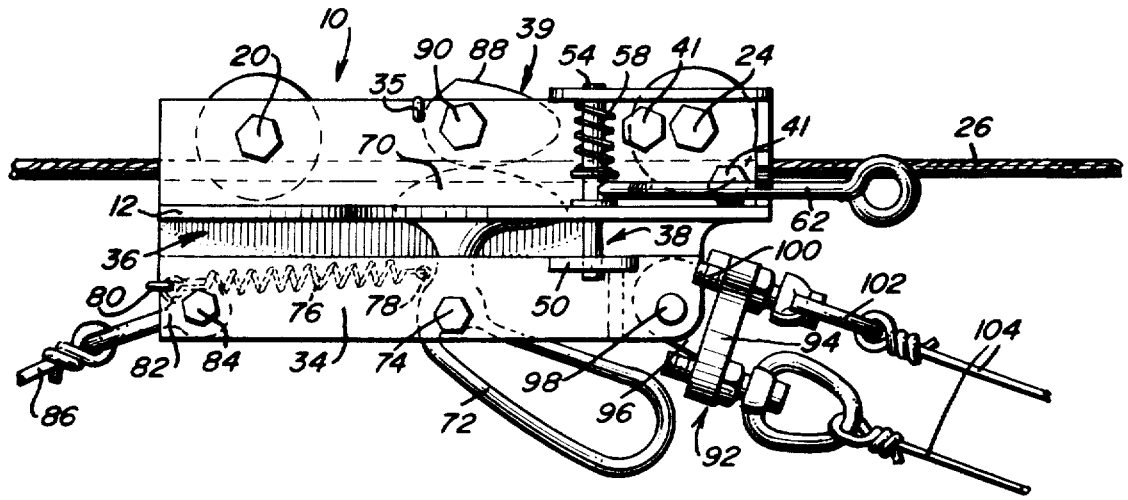
FIG. 1 is a side elevational view of the present cable gripping towing device.
Figure 2:
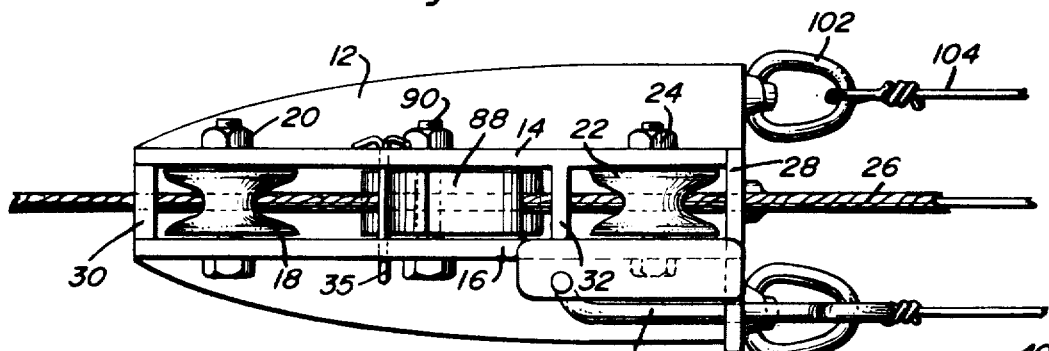
FIG. 2 is a top plan view of the device illustrated in FIG. 1.

Referring to the drawings and more particularly FIGS. 1 and 2 thereof, reference numeral 10 generally illustrates the framework of the present cable gripping towing device. The framework includes a split sole-shaped base plate 12 which deflects obstructions, such as tree branches, during forward traverse of the device. For purposes of convenience, the right to left direction will be referred to as the forward direction, while the left to right direction will be referred to as the backward direction. The remainder of the framework includes a side wall 14 having one-half of the sole-plate welded thereto. The second side wall 16 carries the other half of the sole plate and is disposed in parallel spaced relation from the side wall 14. However, the side wall 16 is not vertically continuous as is the side wall 14. An opening is formed therein as hereinafter explained.

A first roller 18 is positioned between the side walls 14 and 16, at the forward ends thereof. A second roller 22 is positioned between the side walls 14 and 16, at the rear end portions thereof. Suitable fasteners 20 and 24 secure their respective rollers 18 and 22 to the side walls. The rollers ride atop a messenger cable 26 that is strung between poles (not shown). The ends of the side walls 14 and 16 have transverse closure plates 28 and 30 that are suitably attached to the transverse ends of the walls 14 and 16. A flange 32 is positioned between the side walls 14 and 16 at a point somewhat to the left of roller 22. This flange serves to connect the side walls 14 and 16 at aligned intermediate wall points. An elongated horizontal opening or passageway 36 is formed between confronting horizontal edges of side wall 16. The opening is adapted to allow passage of the messenger cable 26 therethrough and into engagement with the rollers 18 and 22. Once the messenger cable 26 has been so inserted, a latch assembly generally indicated by reference numeral 38 insures that it will not slip out from the opening 36. Accordingly, the latch assembly 38 serves as a safety device to prevent the towing device from falling onto workmen below. In the event the messenger cable 36 does disengage itself from the rollers, the towing device will still remain on the messenger cable so as to permit the towing device to be pulled to a convenient point where it may be replaced on the messenger cable.

Between the rollers 18 and 22 is positioned a cam assembly 39 which serves as a one-way lock to allow free passage of the towing device in the forward direction but which prevents backward movement of the towing device when a forwardly attached towrope is released. A key 35 limits cam 39 to the general position shown in FIG. 1 by preventing the cam from flipping to a reverse position.

Figure 4:
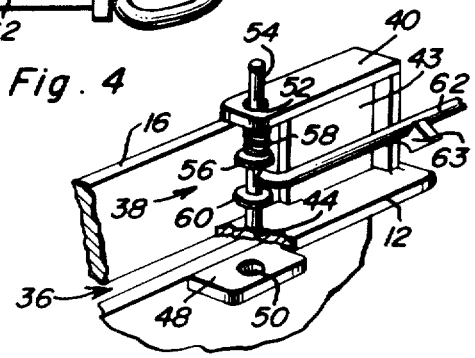
FIG. 4 is a fragmental perspective view with parts in section illustrating means for locking the towing device on the messenger cable.

Studying the latch assembly 38 in greater detail, reference is made to FIG. 4 wherein the upper portion of side wall 16 is seen to rearwardly mount an L-shaped angle bracket 40 thereon. Suitable fasteners 41 (FIG. 1) such as cap screws clamp a base plate 43 of the angle bracket 40 against the side wall 16. The horizontally disposed element of the L-shaped bracket includes an aperture 52 to vertically guide a pin 54 therein. A washer 56 is suitably keyed or pinned in concentric relation with the pin or rod 54, below the horizontal element of the bracket 40. A coil spring 58 is concentrically positioned on the rod 54 and has its outer ends abutting the horizontal element of the bracket 40 and the confronting surface of concentrically mounted washer 56. Due to the inclination of the spring 58, the rod 54 is urged downwardly so that the lower free end portion thereof can pass through an opening 44 formed in the sole-shaped plate 12 and in gating relationship across the opening 36. A small apertured plate 48 is suitably attached in cantilevered fashion to the lower portion of the side wall 16. An opening 50 in this plate receives the lower end of rod 54. A washer 60 is suitably fastened to the rod 54 at a point intermediate the washer 56 and the upper surface of the sole-shaped plate 12. This latter mentioned washer acts as a mechanical stop (contacting plate 12) to limit the downward travel of rod 54. A handle 62 extends perpendicularly outwardly from the rod 54 at a point intermediate the washers 56 and 60. A spade-shaped element extends forwardly from the vertically disposed portion of the L-shaped bracket 40. This element indicated by reference numeral 63 serves as a detent to hold rod 54 in a raised open position (as indicated in FIG. 4) or, by engaging the lower surface of the element 63 the handle 62 is latched into a lowered closed position by the handle 62 snapping between the plate 12 and the lower edge of element 63.

Figure 3:
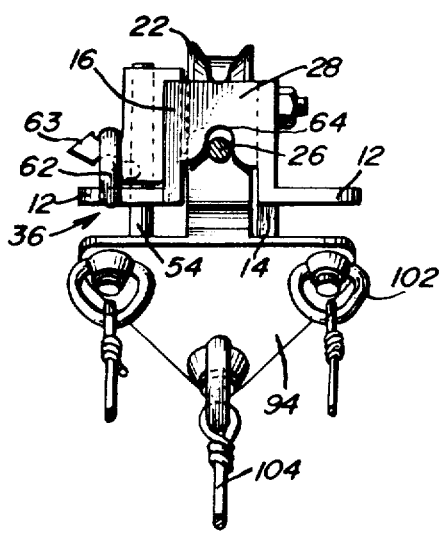
FIG. 3 is an end view of the device illustrated in FIGS. 1 and 2. The end illustrated is that end which attaches signal cables.

As indicated in FIGS. 2 and 3, the transverse closure ends 28 and 30 include notches 64 formed therein which are in registry with the lower portion of the horizontally aligned rollers 18 and 22.

Considering the cam assembly 39, a lower camming member 70 having an inverted shoe shape is pivotally mounted on a fastener 74 to the lower portions of the side walls 14 and 16. The lowermost portion of the camming member 70 extends to a handle 72 that permits the camming member to be manually rotated when the device is installed or removed. A coil spring 76 is connected at opposite ends thereof to eye 78 that is attached to the camming member 70 and to a pin 80 that is disposed between the lower portions of the side walls 14 and 16. The spring 76 serves to bias the cam member 70 in a position contacting the messenger cable 26.

A clevis 82 is pivotally connected by a fastener 84 to the inner surfaces of the lower side wall portions 14 and 16 at the forward ends. This clevis is adapted to mount the upper end of a tow line 86. By towing the tow line 86 forwardly, the cable gripping towing device is moved forwardly on the messenger cable. However, when the tow line is released and the device begins to slide back, a roughened or serrated surface on the camming member 70, that contacts the messenger cable 26, urges the camming member into intimate engagement with the messenger cable. Also, a second camming member 88 has a roughened or serrated camming surface moved into a more intimate engagement with cable 26 so as to effect the locking of the towing device on the messenger cable as soon as the towrope is released. It will be noted that the second camming member 88 has a profile generally resembling an egg-shape. A fastener 90 centrally passes through the thickened portion of the camming member 88. Thus, the weight of the second camming member 88 forces this member into contact with the messenger cable 26. It is to be emphasized that the camming members 88 and 70 ride freely across the messenger cable when the towing device is pulled forwardly. This is due to the configuration of the camming surfaces. However, the very same surfaces, which are preferably roughened will clamp the messenger cable 26 therebetween when the towing device attempts to slide backwards.

As previously mentioned, it is desirable to have swivel members, attaching the signal cables, yield under the force of the signal cables when the towrope is released. This prevents the signal cables from imparting a lever arm force on the swivel members that would tend to lift the forward end of the towing device from the messenger cable 26. Toward these ends the present invention includes a generally vertically positioned plate 94 that is generally triangularly shaped. On the forward surface of this plate is a clevis 96 that is rotatably fastened between interior confronting surfaces of the lower portions of side walls 14 and 16. A pin 98 passing through these side wall portions mounts the clevis for pivotal movement about a transverse axis disposed forwardly of the rear roller axis 24. Swivel members 102 have threaded end portions 100 for securement in the plate 94. As will be seen in FIG. 3, three swivel members are symmetrically positioned at the corners of the triangular plate. Signal cables 104 are attached to the swivel members 102 to permit the device to tow the signal cables along the length of the messenger cable 26. Although the drawings illustrate three signal cables as being pulled by the device, it is to be understood that any number of symmetrically positioned swivel members can be removably mounted to the towing device. Thus, if one signal cable is to be towed, a single swivel member (not shown) would be attached to a clevis such as 96 and attached or detached by removal and reinstallation of pin 98, as desired.

The upper cam may take the form of a roller which serves to support the towing device on the messenger cable. The lower cam member 70 would operate in the same manner that is, clamp the messenger strand against the roller so that the towing device will not move backward on the messenger strand when the tow rope is slackened. This enables the device to be constructed with only one roller which serves a dual function and materially reduces the cost of the device.

In order to operate the present invention, the towing device is lifted to the messenger cable 26. Then, the latching assembly 38 is opened and set in the opened position as indicated in FIG. 4. This allows entry of the messenger cable 26 through the opening 36 in the device. Next, the handle 72 of the camming member 70 is forced downwardly which causes a separation of the camming members 88 and 70. By so doing, the messenger cable 26 can be inserted between the camming members 88 and 70 and then the messenger cable 26 is set to engage the rollers 18 and 22.

This procedure is reversed when the towing device is to be removed from the messenger cable 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cable tow device adapted for travel along a messenger cable when pulled by a towrope to string a signal cable, the device comprising a framework, means for attaching said towrope to the framework, pivotal means mounted to the framework for connecting said signal cable to the framework, and one-way locking means for automatically clamping the messenger cable to the framework in response to removal of tension from the towrope thus preventing rearward displacement of the device along the messenger cable, the locking means being ineffective during forward travel of the framework on the messenger cable.

2. The structure of claim 1 wherein the pivotal means is positioned on a trailing end of the framework and wherein the pivotal means comprises swivel means mounted by a clevis to the framework, the clevis being rotatable in the direction urged by the weight of the signal cable upon release of the towrope thereby preventing the signal cable from becoming a lever arm force on the device.

3. The structure of claim 1 wherein the locking means comprises first eccentric camming means mounted to the framework and second camming means biased to clamp the messenger cable against the first camming means.

4. The structure of claim 1 together with roller members mounted to the device for riding along the messenger cable.

5. The structure of claim 4 wherein the framework includes an elongated opening therein providing a passageway for the messenger cable to come into contacting engagement with the roller members.

6. The structure of claim 5 together with latching means connected across said opening for selectively locking the messenger cable in the device.

7. The structure of claim 6 wherein the latching means includes a slidable member normally biased to gate the opening, and detent means connected to the framework for selectively setting the slidable member in either on opened or closed position.

8. The structure of claim 2 wherein the swivel means include a plurality of swivel members symetrically positioned with respect to each other.

9. The structure of claim 1 in which the locking means comprises a first camming means mounted to the upper part of the framework and positioned over and above the messenger cable in such manner as to be self-biasing to the cable and be self-adjusting for deviation or deformations in the messenger cable or for wear in the device.

10. The structure of claim 9 wherein the locking means includes a second camming means attached to the lower part of the framework in such manner as to be biased to contact the messenger strand in such manner as to clamp the strand between the upper and lower camming means when forward motion of the device ceases.

11. The structure of claim 10 wherein the second camming device includes a cam surface so arranged that it can be mechanically caused to open to allow entrance of the messenger strand into position for clamping by the first and second camming means.

12. The structure of claim 11 wherein the second camming means includes a handle to allow egress of the messenger strand for removal of the device from the strand.

13. The structure of claim 1 wherein the locking means includes a roller as a first camming means mounted to the upper part of the framework and a second camming means biased to clamp the messenger strand between the first and second camming means.

14. The structure of claim 3 wherein a mechanical stop is provided on the framework for engaging one of the camming means to give normal position of said eccentric camming means a trailing position to direction of travel on messenger strand.

* * * * *